O. SPAHR & C. STICHLER.

SAD IRON.

APPLICATION FILED JULY 13, 1916.

Reissued Oct. 1, 1918. 14,527.

WITNESSES

George Du Bon

Henry Pohl

INVENTORS

OTTO SPAHR

CHARLES STICHLER

BY

Briesen & Schreck

ATTORNEYS

THE NORRIS PETERS CO., PHOTO-LITHO., WASHINGTON, D. C.

UNITED STATES PATENT OFFICE.

OTTO SPAHR AND CHARLES STICHLER, OF PHILADELPHIA, PENNSYLVANIA, ASSIGNORS TO STRAUSE GAS IRON CO., OF PHILADELPHIA, PENNSYLVANIA, A CORPORATION OF PENNSYLVANIA.

SAD-IRON.

14,527. Specification of Reissued Letters Patent. Reissued Oct. 1, 1918.

Original No. 948,773, dated February 8, 1910, Serial No. 474,935, filed January 29, 1909. Application for reissue filed July 13, 1916. Serial No. 109,203.

*To all whom it may concern:*

Be it known that we, OTTO SPAHR and CHARLES STICHLER, both citizens of the United States, and both residing in the city and county of Philadelphia, State of Pennsylvania, have invented a new and useful Sad-Iron, of which the following is a specification.

Our invention consists of a sad iron having means for supplying air and gas to the burner thereof, for effectively heating the base of the iron, while also producing a maximum of heat with a minimum of gas and avoiding the smell of unconsumed gas, and other details are presented, as will be hereinafter described.

For the purpose of explaining our invention, the accompanying drawing illustrates a satisfactory reduction of the same to practice, but the important instrumentalities thereof may be varied, and so it is to be understood that the invention is not limited to the specific arrangement and organization shown and described.

Figure 1:
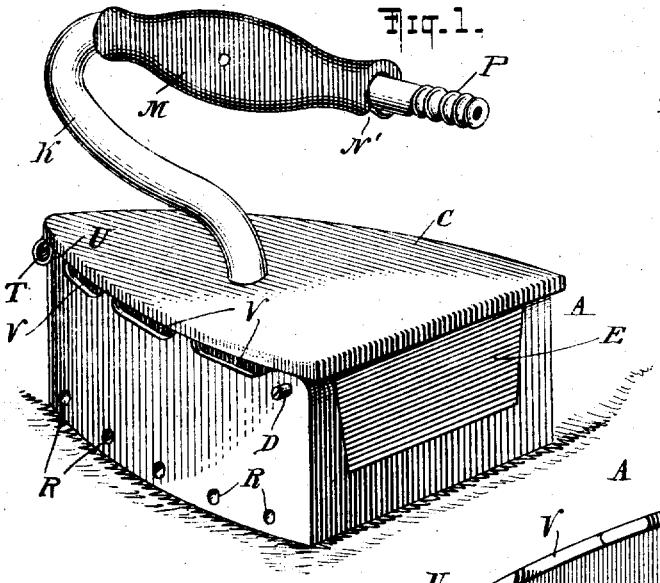
Figure 6:
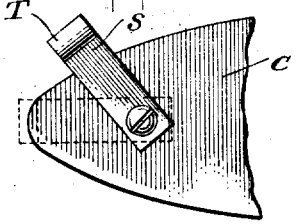
Figure 4:
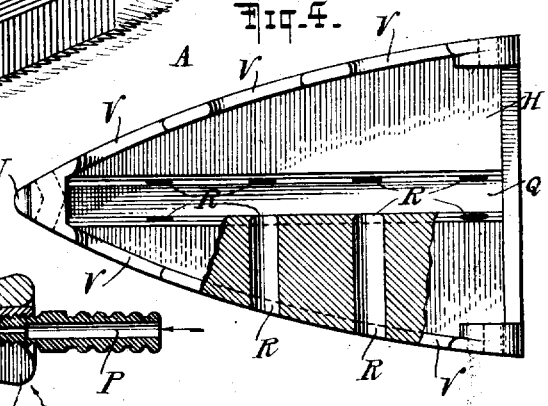
Figure 2:
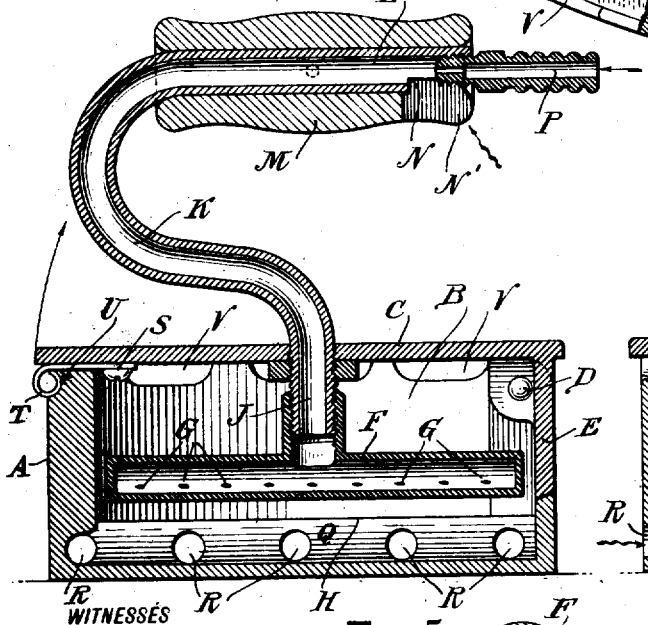
Figure 3:
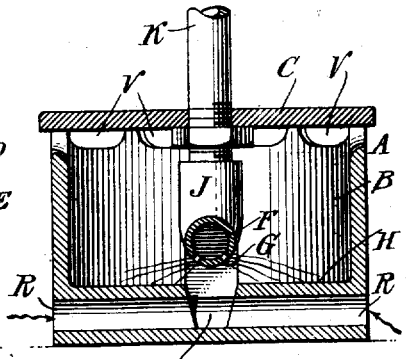
Figure 5:
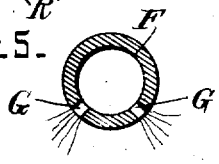

Figure 1 represents a perspective view of a sad iron embodying our invention. Fig. 2 represents a longitudinal vertical section thereof. Fig. 3 represents a transverse vertical section thereof. Fig. 4 represents a top or plan view of the body of the iron. Fig. 5 represents a transverse section of the burner on an enlarged scale. Fig. 6 represents a bottom plan view of a portion of the top plate of the body.

Similar letters of reference indicate corresponding parts in the figures.

Referring to the drawings:—A designates the body of a sad iron comprising an ironing face at its lowermost surface and upright walls connected with the base on all sides to form a hollow, box-like structure, the interior of which forms the heating chamber B. C designates the top plate of said body, the same being connected with the sides of the latter by the pivots D, whereby said top may be raised in the direction as indicated by the arrow, Fig. 2.

E designates a plate comprising a portion of the rear wall of the body A, the same depending from the pivotal end of the top plate C.

Within the chamber B is the pipe F comprising a gas burner, the same having in its under portion the ignition ports or gas jets G, which extend in radial direction so as to direct the burning gas or flame to right and left over the base H of the body of the iron, as indicated by the arrows, Figs. 3 and 5. The burner F depends from the pipe J which is connected with the top plate C and continuous of the bent pipe K which constitutes a portion of the handle of the iron, the upper limb L of said pipe K having the wooden or other grip M thereon and secured thereto. In said limb and grip are air intake-openings N, N′, and on the end of said limb is the gas supply-nipple P, whereby combined air and gas are admitted into said limb after the manner of a Bunsen-burner and from thence directed to the jets G where they are consumed.

In the base H of the body is a longitudinally-extending channel Q, the same forming an air-receiving chamber which communicates with the chamber B and is disposed below the burner F. In said base, there are also transversely-extending passages R, whose outer ends are open to the atmosphere, and whose inner ends open into the channel or chamber Q. These passages R, as shown in Figs. 3 and 4, are covered or located beneath the level of the walls H for their full extent and until they reach the interior of the iron, where they are again open so that the air therefrom is fed upwardly to the inner sides of the flames or between the ignition apertures of adjacent flames.

The gas at the jets G may be ignited by raising the plate C, whereby the burner F is accessible for said purpose, said plate then being lowered and secured by the latch S which is pivoted to said plate and having a head T which is adapted to be seated in the recess U in the nose of forward end of the body A. As the gas burns, air is drawn through the passages R into the chamber Q and the latter is supplied with large volumes of the same. The air is impacted against the flames, whereby the latter are deflected laterally and injected against the upper side of the walls H (which except for the channel Q constitute the bottom surface of the interior of the iron) whereby the flames highly heat said walls for effective operation of the iron, it being noticed also that there will be complete combustion of gas and a consequent maximum of heat with a minimum consumption of the gas, while the smell of unconsumed gas is avoided.

Attention is directed to the fact that there is a natural draft through the body of the iron to the openings V provided for the escape of the products of combustion, the air being admitted to the burner below the same and then supplied to the gas to cause comparative perfect combustion of the latter without permitting the flames to appear on the exterior of the iron. As gas and air in the natural condition are admitted into the handle, the latter is kept in cool condition without in any manner being heated by the same.

Having thus described our invention, what we claim as new and desire to secure by Letters Patent, is:—

1. A non-reversible said iron comprising a base having an ironing surface, upright walls connected therewith to form a hollow box-like structure, a cover therefor, a burner adapted to convey a mixture of gas and air to the interior of said iron and provided with a plurality of jet openings, means for causing the flames from said jet openings to continuously impart their effective heat directly to the top of the inner bottom surface of the iron, said means comprising an air intake originating at the outer walls of said body and leading to a point beneath said burner in proximity to the inner and under sides of said jets whereby the flames are substantially enveloped with air, outlets for the combustion products in the upper portion of the iron sufficient in number and size to permit the setting up of a natural draft through the body of the iron and the unchoked escape of the products of combustion, said outlets opening directly into the hollow body and an unobstructed space within the iron between the gas jets and the outlets to permit the escape of products of combustion in a direct and non-circuitous stream.

2. In a sad iron a base having an ironing surface, upright walls connected therewith to form a hollow box-like structure open at the top, a cover therefor, apertures through the upper portion of said iron for the escape of products of combustion and for the establishment of a natural draft through the body of the iron, a burner in said body above said base, jet openings in said burner and means for conducting air from a point originating at the outer walls of said body and leading to the under and inner sides of the jets and supplying sufficient air to result in substantially complete combustion in the natural draft which exists between said air inlet and the escape openings above and to cause the flames from the jets to continuously impart their effective heat directly to the top of the inner bottom surface of the iron.

3. In a gas iron, a hollow body, an ironing surface, an air chamber positioned in the lower inner portion of the hollow body, said chamber having air supply channels extending through the iron and connecting with the atmosphere, a gas burner over said chamber and adapted to deliver gas flames over the bottom inner surface which defines the hollow space in the iron, the chamber being arranged to direct the air around the flames, escape openings for the products of combustion in said body, the inner part of said escape openings lying in planes to the sides of the vertical planes between which the said gas burner is located, whereby direct escape of the products of combustion is established and perfect combustion of the gas results.

4. A non-reversible sad iron comprising a base having an ironing surface, upright walls connected therewith to form a hollow box-like structure, a cover therefor, a burner adapted to convey a mixture of gas and air to the interior of said iron and provided with a plurality of jet openings discharging toward said base, means for causing the flames from said jet openings to continuously impart their effective heat directly to the top of the inner bottom surface of the iron, said means comprising a longitudinal channel on the interior surface of the base, means for supplying air to said channel through the base and to a point beneath said burner in proximity to the inner and under sides of said jets whereby the flames are substantially enveloped with air, outlets for the combustion products in the upper portion of the iron sufficient in number and size to permit the setting up of a natural draft through the body of the iron and the unchoked escape of the products of combustion, said outlets opening directly into the hollow body and an unobstructed space within the iron between the gas jets and the outlets to permit the escape of products of combustion in a direct and non-circuitous stream.

5. In a sad iron a base having an ironing surface, upright walls connected therewith to form a hollow box-like structure open at the top, a cover therefor, apertures through the upper portion of said iron for the escape of products of combustion and for the establishment of a natural draft through the body of the iron, a longitudinal channel on the interior surface of the base, a burner in said body above said channel, jet openings in said burner discharging toward the base, and means for conducting air from a point originating at the outer walls of said body and leading to the under and inner sides of the jets and supplying sufficient air to result in substantially complete combustion in the natural draft which exists between said air inlet and the escape openings above and to cause the flames from the jets to continuously impart their effective heat directly to the top of the inner bottom surface of the iron.

In testimony whereof we have hereunto set our hands.

OTTO SPAHR.
CHARLES STICHLER.

Copies of this patent may be obtained for five cents each, by addressing the "Commissioner of Patents, Washington, D. C."